US009807559B2

(12) United States Patent
Clark et al.

(10) Patent No.: US 9,807,559 B2
(45) Date of Patent: Oct. 31, 2017

(54) LEVERAGING USER SIGNALS FOR IMPROVED INTERACTIONS WITH DIGITAL PERSONAL ASSISTANT

(71) Applicant: Microsoft Corporation, Redmond, WA (US)

(72) Inventors: Lee Dicks Clark, Seattle, WA (US); Deborah B. Harrison, Seattle, WA (US); Susan Hendrich, Redmond, WA (US); David Gardner, Seattle, WA (US); Sogol Malekzadeh, Sammamish, WA (US); Catherine L. Maritan, Ottawa (CA); Melissa Lim, Seattle, WA (US); Mary P. Czerwinski, Kirkland, WA (US); Ran Gilad-Bachrach, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 73 days.

(21) Appl. No.: 14/315,049

(22) Filed: Jun. 25, 2014

(65) Prior Publication Data
US 2015/0382147 A1 Dec. 31, 2015

(51) Int. Cl.
*H04M 3/42* (2006.01)
*H04W 4/02* (2009.01)
(Continued)

(52) U.S. Cl.
CPC ....... *H04W 4/025* (2013.01); *H04M 1/72569* (2013.01); *H04M 3/42365* (2013.01);
(Continued)

(58) Field of Classification Search
CPC .... H04L 69/324; H04W 52/028; H04W 88/06
(Continued)

(56) References Cited

U.S. PATENT DOCUMENTS 6,731,307 B1 * 5/2004 Strubbe .................. G06N 3/004
704/E17.002
7,974,849 B1 * 7/2011 Begole ............... G06Q 10/0631
705/1.1
(Continued)

FOREIGN PATENT DOCUMENTS

EP      2093966 A1    8/2009
WO   2011110727 A1    9/2011

OTHER PUBLICATIONS

International Search Report & Written Opinion Received for PCT Application No. PCT/US2015/036858, Mail Sep. 30, 2015, 11 Pages.

(Continued)

*Primary Examiner* — Joseph Arevalo
(74) *Attorney, Agent, or Firm* — Fiala & Weaver P.L.L.C.

(57) ABSTRACT

Systems, methods, apparatuses, and computer program products are described for implementing a digital personal assistant. The digital personal assistant is capable of determining that a user has asked a question or made a statement that is intended to engage with a persona of the digital personal assistant. In response to determining that the user has asked such a question or made such a statement, the digital personal assistant provides a response thereto by displaying or playing back a multimedia object associated with a popular culture reference within or by a user interface of the digital personal assistant. Additionally or alternatively, in response to determining that the user has asked such a question or made such a statement, the digital personal assistant provides the response thereto by generating or playing back speech that comprises an impersonation of a voice of a person associated with the popular culture reference.

20 Claims, 6 Drawing Sheets

(51) Int. Cl.
  *H04W 8/18*    (2009.01)
  *H04M 1/725*   (2006.01)
  *H04W 4/16*    (2009.01)
  *H04W 4/18*    (2009.01)

(52) U.S. Cl.
  CPC ............... *H04W 4/16* (2013.01); *H04W 8/18* (2013.01); *H04W 4/18* (2013.01)

(58) Field of Classification Search
  USPC ....... 455/411, 446, 436, 407, 406, 405, 517, 455/41.2; 704/232
  See application file for complete search history.

(56) References Cited

U.S. PATENT DOCUMENTS

| | | | | |
|---|---|---|---|---|
| 8,954,372 | B2* | 2/2015 | Biehl | G06N 5/02 706/52 |
| 2002/0029203 | A1 | 3/2002 | Pelland et al. | |
| 2003/0046401 | A1* | 3/2003 | Abbott | G06F 9/4443 709/228 |
| 2005/0054381 | A1 | 3/2005 | Lee et al. | |
| 2006/0129405 | A1* | 6/2006 | Elfanbaum | G06Q 30/02 704/270 |
| 2007/0121882 | A1 | 5/2007 | Timmins et al. | |
| 2007/0300225 | A1* | 12/2007 | Macbeth | G06Q 10/10 718/100 |
| 2008/0208015 | A1* | 8/2008 | Morris | A61B 5/0022 600/301 |
| 2009/0106848 | A1* | 4/2009 | Coley | G06F 21/6263 726/26 |
| 2009/0318777 | A1 | 12/2009 | Kameyama | |
| 2010/0099955 | A1* | 4/2010 | Thomas | H04L 12/1827 600/300 |
| 2010/0223341 | A1* | 9/2010 | Manolescu | G06F 17/30905 709/206 |
| 2010/0262487 | A1* | 10/2010 | Edwards | G06Q 30/02 705/14.43 |
| 2011/0044431 | A1 | 2/2011 | Klemm | |
| 2011/0283190 | A1 | 11/2011 | Poltorak | |
| 2013/0110520 | A1 | 5/2013 | Cheyer et al. | |
| 2013/0110895 | A1* | 5/2013 | Valentino | G06F 7/588 708/255 |
| 2013/0212501 | A1 | 8/2013 | Anderson et al. | |
| 2013/0302766 | A1 | 11/2013 | Gold | |
| 2014/0214994 | A1* | 7/2014 | Rueckert | H04L 51/14 709/206 |

OTHER PUBLICATIONS

"Second Written Opinion Issued in PCT Application No. PCT/US2015/036858", Mailed Date: Apr. 29, 2016, 06 Pages.

"International Preliminary Report on Patentability Issued in PCT Application No. PCT/US2015/036858", Mailed Date: Oct. 13, 2016, 7 Pages.

* cited by examiner

LEVERAGING USER SIGNALS FOR IMPROVED INTERACTIONS WITH DIGITAL PERSONAL ASSISTANT

BACKGROUND

As used here, the term "digital personal assistant" refers to a software agent that can perform tasks, or services, for an individual. Such task or services may be performed, for example, based on user input, location awareness, and the ability to access information from various online sources (such as weather or traffic conditions, news, stock prices, user schedules, retail prices, etc.). Some examples of conventional digital personal assistants include CORTANA® (published by Microsoft Corporation of Redmond, Wash. as part of the WINDOWS® 8.1 operating system), SIRI® (published by Apple Computer of Cupertino, Calif.), and GOOGLE NOW™ (published by Google, Inc. of Mountain View, Calif.).

SUMMARY

Systems, methods, apparatuses, and computer program products are described herein for implementing a digital personal assistant that can proactively initiate conversations with a user. In order to avoid interrupting or otherwise annoying the user, the personal digital assistant may be programmed to initiate conversations only at times that are determined by the digital personal assistant to be appropriate for doing so. To this end, the digital personal assistant leverages a variety of signals that relate to the availability of the user and/or to the user's mental or emotional state to determine whether a particular time is appropriate for starting a conversation. If the user signals relating to the user's availability and/or mental and emotional state indicate that the particular time is appropriate for starting a conversation, then the digital personal assistant will attempt to initiate a conversation. However, if the user signals relating to the user's availability and mental or emotional state indicate that the particular time is not appropriate for starting a conversation, then the digital personal assistant will not attempt to initiate a conversation. By leveraging user signals in this manner, the digital personal assistant can proactively initiate conversations with the user in a manner that is less likely to be perceived as annoying, invasive, or untimely.

In particular, a method performed by a digital personal assistant implemented on at least one computing device is described herein. In accordance with the method, one or more first signals related to an availability of a user are obtained. One or more second signals related to a mental or emotional state of the user are also obtained. It is then determined whether a particular time is an appropriate time to attempt to initiate a conversation with the user based at least on the first signal(s) and the second signal. In response to a determination that the particular time is an appropriate time to attempt to initiate the conversation with the user, an attempt is made to initiate the conversation with the user.

In an embodiment of the foregoing method, the first signal(s) include one or more of calendar information associated with the user, daily habits information associated with the user, and information associated with a current activity of the user.

In a further embodiment of the foregoing method, the second signal(s) include one or more of: facial expressions of the user; voice characteristics of the user; a location of the user; a rate at which the user is turning on and off a mobile device; keystroke and/or gesture metadata associated with the user; written and/or spoken content of the user; application interaction metadata associated with the user; accelerometer, compass, and/or gyroscope output; degree of exposure to light; temperature; weather conditions; traffic conditions; pollution and/or allergen levels; activity level of the user; heart rate and heart rate variability of the user; electrodermal activity of the user; device and/or network connection information for a device associated with the user; and battery and/or charging information for a device associated with the user.

In another embodiment of the foregoing method, the second signal(s) include one or more signals identified by a machine learner as being determinative of the mental or emotional state of the user. In further accordance with such an embodiment, the machine learner may be trained by one or more of a test population and the user.

In yet another embodiment of the foregoing method, attempting to initiate the conversation with the user includes querying the user to determine if he or she is available to converse and, in response to receiving a positive response to the query, selecting a conversation topic, and initiating a conversation with the user about the selected conversation topic. In further accordance with such an embodiment, selecting the conversation topic may include selecting the conversation topic based on one or more of a set of current events and a set of interests of the user.

A system is also described herein. The system includes at least one processor and a memory that stores computer program logic for execution by the at least one processor. The computer program logic includes one or more components configured to perform operations when executed by the at least one processor. The one or more components include a digital personal assistant. The digital personal assistant is configured to obtain one or more signals related to an availability of a user, to obtain one or more second signals related to a mental or emotional state of the user, to determine whether a particular time is an appropriate time to attempt to initiate a conversation with the user based at least on the first signal(s) and the second signal(s), and to attempt to initiate the conversation with the user in response to a determination that the particular time is an appropriate time to attempt to initiate the conversation with the user.

In an embodiment of the foregoing system, the first signal(s) include one or more of calendar information associated with the user, daily habits information associated with the user, and information associated with a current activity of the user.

In a further embodiment of the foregoing system, the second signal(s) include one or more of: facial expressions of the user; voice characteristics of the user; a location of the user; a rate at which the user is turning on and off a mobile device; keystroke and/or gesture metadata associated with the user; written and/or spoken content of the user; application interaction metadata associated with the user; accelerometer, compass, and/or gyroscope output; degree of exposure to light; temperature; weather conditions; traffic conditions; pollution and/or allergen levels; activity level of the user; heart rate and heart rate variability of the user; electrodermal activity of the user; device and/or network connection information for a device associated with the user; and battery and/or charging information for a device associated with the user.

In another embodiment of the foregoing system, the second signal(s) include one or more signals identified by a machine learner as being determinative of the mental or emotional state of the user. In further accordance with such an embodiment, the machine learner may be trained by one or more of a test population and the user.

In yet another embodiment, the digital personal assistant is configured to attempt to initiate the conversation with the user by querying the user to determine if he or she is available to converse, and, in response to receiving a positive response to the query, selecting a conversation topic, and conversing with the user about the selected conversation topic. In further accordance with such an embodiment, the digital personal assistant may be configured to select the conversation topic based on one or more of a set of current events and a set of interests of the user.

A computer program product is also described herein. The computer program product includes a computer-readable memory having computer program logic recorded thereon that when executed by at least one processor causes the at least one processor to perform a method of operating a digital personal assistant. The method includes obtaining from a mobile device operated by a user one or more first signals related to an availability of the user, obtaining from the mobile device one or more second signals related to a mental or emotional state of the user, determining whether a particular time is an appropriate time to attempt to initiate a conversation with the user based at least on the first signal(s) and the second signal(s), and in response to a determination that the particular time is an appropriate time to attempt to initiate the conversation with the user, attempting to initiate the conversation with the user.

In an embodiment of the foregoing computer program product, the first signal(s) includes one or more of calendar information associated with the user, daily habits information associated with the user, and information associated with a current activity of the user.

In a further embodiment of the foregoing computer program product, the second signal(s) include one or more of facial expressions of the user; voice characteristics of the user; a location of the user; a rate at which the user is turning on and off a mobile device; keystroke and/or gesture metadata associated with the user; written and/or spoken content of the user; application interaction metadata associated with the user; accelerometer, compass, and/or gyroscope output; degree of exposure to light; temperature; weather conditions; traffic conditions; pollution and/or allergen levels; activity level of user; heart rate and heart rate variability of the user; electrodermal activity of the user; device and/or network connection information for a device associated with the user; and battery and/or charging information for a device associated with the user.

In another embodiment of the foregoing computer program product, the second signal(s) include one or more signals identified by a machine learner as being determinative of the mental or emotional state of the user. In further accordance with such an embodiment, the machine learner may be trained by one or more of a test population and the user.

In yet another embodiment of the foregoing computer program product, attempting to initiate the conversation with the user includes querying the user to determine if he or she is available to converse and, in response to receiving a positive response to the query, selecting a conversation topic, and initiating a conversation with the user about the selected conversation topic.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
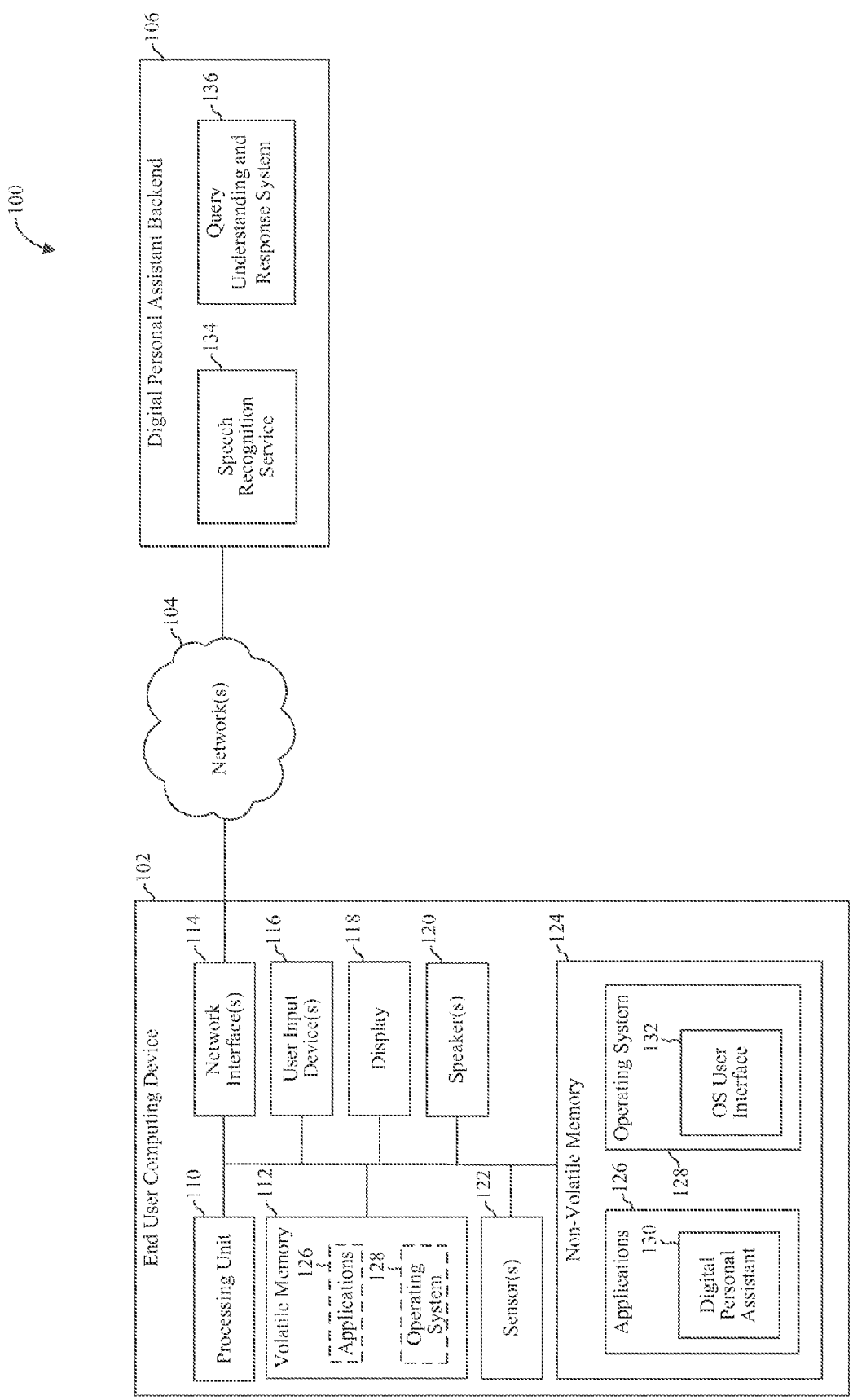
FIG. 1 is a block diagram of a system that implements a digital personal assistant that leverages user signals to determine appropriate times to proactively initiate conversations with a user in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Conventional digital personal assistants are typically programmed to interact with users only in the course of responding to explicit user requests. That is to say, conventional digital personal assistants typically do not proactively initiate conversations with users. This may be due, at least in part, to a concern that attempts to initiate conversations by a digital personal assistant will be perceived by the user as annoying, invasive, or untimely. However, there can be very good reasons to enable a digital personal assistant to proactively initiate conversations with a user. For example, the digital personal assistant may be able to proactively offer assistance to a user at a time when the user could benefit from such assistance but is unable to ask for it or when the user is unaware that the digital personal assistant can provide it. Furthermore, by enabling the digital personal assistant to proactively initiate conversations with the user, the digital personal assistant can provide a sense of companionship to the user as well as create new opportunities to delight, entertain, and even learn about the user.

Embodiments described herein relate to a personal digital assistant that can proactively initiate conversations with a user. In order to avoid interrupting or otherwise annoying the user, the personal digital assistant is programmed to initiate conversations only at times that are determined by the digital personal assistant to be appropriate for doing so. To this end, the digital personal assistant leverages a variety of signals that relate to the availability of the user and to the user's mental or emotional state to determine whether a particular time is appropriate for starting a conversation. If the user signals relating to the user's availability and/or mental and emotional state indicate that the particular time is appropriate for starting a conversation, then the digital personal assistant will attempt to initiate a conversation. However, if the user signals relating to the user's availability and mental or emotional state indicate that the particular time is not appropriate for starting a conversation, then the digital personal assistant will not attempt to initiate a conversation. By leveraging user signals in this manner, the digital personal assistant can proactively initiate conversations with the user in a manner that is less likely to be perceived as annoying, invasive, or untimely.

Section II describes an example system that implements a digital personal assistant that proactively initiate conversations with a user and that leverages user signals to determine appropriate times for initiating such conversations. Section III describes exemplary methods for implementing such a digital personal assistant. Section IV describes an example mobile device that may be used to implement a digital personal assistant in accordance with embodiments described herein. Section V describes an example desktop computer that may be used to implement a digital personal assistant in accordance with embodiments described herein. Section VI provides some concluding remarks.

II. Example System that Implements a Digital Personal Assistant that Leverages User Signals to Determine Appropriate Times to Proactively Initiate Conversations with a User FIG. 1 is a block diagram of a system 100 that implements a digital personal assistant that leverages user signals to determine appropriate times to proactively initiate conversations with a user in accordance with an example embodiment. As shown in FIG. 1, system 100 includes an end user computing device 102 that is communicatively connected to a digital personal assistant backend 106 via one or more networks 104. Each of these components will now be described.

End user computing device 102 is intended to represent a processor-based electronic device that is capable of executing a software-based digital personal assistant 130 that is installed thereon. Digital personal assistant 130 may be executed on behalf of a user of end user computing device 102. In one embodiment, end user computing device 102 comprises a mobile computing device such as a mobile phone (e.g., a smart phone), a laptop computer, a tablet computer, a netbook, a wearable computer such as a smart watch or a head-mounted computer, a portable media player, a handheld gaming console, a personal navigation assistant, a camera, or any other mobile device capable of executing a digital personal assistant on behalf of a user. One example of a mobile device that may incorporate the functionality of end user computing device 102 will be discussed below in reference to FIG. 6. In another embodiment, end user computing device 102 comprises a desktop computer, a gaming console, or other non-mobile computing platform that is capable of executing a digital personal assistant on behalf of a user. An example desktop computer that may incorporate the functionality of end user computing device 102 will be discussed below in reference to FIG. 7.

End user computing device 102 is capable of communicating with digital personal assistant backend 106 via network 104. Digital personal assistant backend 106 comprises one or more computers (e.g., server computers) that are programmed to provide services in support of the operations of digital personal assistant 130 and other digital personal assistants executing on other end-user computing devices. For example, digital personal assistant backend 106 may include one or more computers configured to provide services to digital personal assistant 130 relating to speech recognition and query understanding and response. In particular, as shown in FIG. 1, these services are respectively provided by a speech recognition service 134 and a query understanding and response system 136. It is noted that digital personal assistant backend 106 may perform any number of other services on behalf of digital personal assistant 130 although such additional services may not be explicitly described herein.

In one embodiment, digital personal assistant backend 106 comprise a cloud-based backend in which any one of a large number of suitably-configured machines may be arbitrarily selected to render one or more desired services in support of digital personal assistant 130. As will be appreciated by persons skilled in the relevant art(s), such a cloud-based implementation provides a reliable and scalable framework for providing backend services to digital personal assistants, such as digital personal assistant 130.

Network(s) 104 is intended to represent any type of network or combination of networks suitable for facilitating communication between end user computing devices, such as end user computing device 102, and digital personal assistant backend 106. Network(s) 104 may include, for example and without limitation, a wide area network, a local area network, a private network, a public network, a packet network, a circuit-switched network, a wired network, and/or a wireless network.

As further shown in FIG. 1, end user computing device 102 includes a plurality of interconnected components, including a processing unit 110, volatile memory 112, non-volatile memory 124, one or more network interfaces 114, one or more user input devices 116, a display 118, one or more speakers 120, and one or more sensors 122. Each of these components will now be described.

Processing unit 110 is intended to represent one or more microprocessors, each of which may comprise one or more central processing units (CPUs) or microprocessor cores. Processing unit 110 may be implemented using other types of integrated circuits as well. Processing unit 110 operates in a well-known manner to execute computer programs (also referred to herein as computer program logic). The execution of such computer programs causes processing unit 110 to perform operations including operations that will be described herein. Each of volatile memory 112, non-volatile memory 124, network interface(s) 114, user input device(s) 116, display 118, speaker(s) 120 and sensor(s) 122 is connected to processing unit 110 via one or more suitable interfaces.

Non-volatile memory 124 comprises one or more computer-readable memory devices that operate to store computer programs and data in a persistent manner, such that stored information will not be lost even when end user computing device 102 is without power or in a powered down state. Non-volatile memory 124 may be implemented using any of a wide variety of non-volatile computer-readable memory devices, including but not limited to, read-only memory (ROM) devices, solid state drives, hard disk drives, magnetic storage media such as magnetic disks and associated drives, optical storage media such as optical disks and associated drives, and flash memory devices such as USB flash drives.

Volatile memory 112 comprises one or more computer-readable memory devices that operate to store computer programs and data in a non-persistent manner, such that the stored information will be lost when end user computing device 102 is without power or in a powered down state. Volatile memory 112 may be implemented using any of a wide variety of volatile computer-readable memory devices including, but not limited to, random access memory (RAM) devices.

Display 118 comprises a device to which content, such as text and images, can be rendered so that it will be visible to a user of end user computing device 102. Some or all of the rendering operations required to display such content may be performed by processing unit 110. Some or all of the rendering operations may also be performed by a display device interface such as a video or graphics chip or card (not shown in FIG. 1) that is coupled between processing unit 110 and display 118. Depending upon the implementation of end user computing device 102, display 118 may comprise a device that is integrated within the same physical structure or housing as processing unit 110 or may comprise a monitor, projector, or other type of device that is physically separate from a structure or housing that includes processing unit 110 and connected thereto via a suitable wired and/or wireless connection.

Speaker(s) 120 comprise one or more electroacoustic transducers that produce sound in response to an electrical audio signal. Speaker(s) 120 provide audio output to a user of end user computing device. Some or all of the operations required to produce the electrical audio signal(s) that are received by speaker(s) 120 may be performed by processing unit 110. Some or all of these operations may also be performed by an audio interface such as an audio chip or card (not shown in FIG. 1) that is coupled between processing unit and speaker(s) 120. Depending upon the implementation of end user computing device 102, speaker(s) 120 may comprise device(s) that are integrated within the same physical structure or housing as processing unit 100 or may comprise external speaker(s) that are physically separate from a structure or housing that includes processing unit 110 and connected thereto via suitable wired and/or wireless connections.

User input device(s) 116 comprise one or more devices that operate to generate user input information in response to a user's manipulation or control thereof. Such user input information is passed via a suitable interface to processing unit 110 for processing thereof. Depending upon the implementation, user input device(s) 116 may include a touch screen (e.g., a touch screen integrated with display 118), a keyboard, a keypad, a mouse, a touch pad, a trackball, a joystick, a pointing stick, a wired glove, a motion tracking sensor, a game controller or gamepad, or a video capture device such as a camera. However, these examples are not intended to be limiting and user input device(s) 116 may include other types of devices other than those listed herein. Depending upon the implementation, each user input device 116 may be integrated within the same physical structure or housing as processing unit 110 (such as an integrated touch screen, touch pad, or keyboard on a mobile device) or physically separate from a physical structure or housing that includes processing unit 110 and connected thereto via a suitable wired and/or wireless connection.

Sensor(s) 122 comprise one or more devices that detect or sense physical stimulus (such as motion, light, heat, sound, pressure, magnetism, etc.) and generate a resulting signal (e.g., for measurement or control). Example sensors 122 that may be included in end user computing device 102 may include but are not limited to an accelerometer, a digital compass, a gyroscope, a Global Position System (GPS) sensor, a pressure sensor associated with an input device such as a touch screen or keyboard/keypad, a microphone and a camera. Signals generated by sensor(s) 122 may be collected and processed by processing unit 110 or other logic within end user computing device 102 to support a variety of applications.

Network interface(s) 114 comprise one or more interfaces that enable end user computing device 102 to communicate over one or more networks 104. For example, network interface(s) 114 may comprise a wired network interface such as an Ethernet interface or a wireless network interface such as an IEEE 802.11 ("Wi-Fi") interface or a 3G telecommunication interface. However, these are examples only and are not intended to be limiting.

As further shown in FIG. 1, non-volatile memory 124 stores a number of software components including a plurality of applications 126 and an operating system 128.

Each application in plurality of applications 126 comprises a computer program that a user of end user computing device 102 may cause to be executed by processing unit 110. The execution of each application causes certain operations to be performed on behalf of the user, wherein the type of operations performed will vary depending upon how the application is programmed Applications 126 may include, for example and without limitation, a telephony application, an e-mail application, a messaging application, a Web browsing application, a calendar application, a utility application, a game application, a social networking application, a music application, a productivity application, a lifestyle application, a reference application, a travel application, a sports application, a navigation application, a healthcare and fitness application, a news application, a photography application, a finance application, a business application, an education application, a weather application, a books application, a medical application, or the like. As shown in FIG. 1, applications 126 include a digital personal assistant 130, the functions of which will be described in more detail herein.

Applications 126 may be distributed to and/or installed on end user computing device 102 in a variety of ways, depending upon the implementation. For example, in one embodiment, at least one application is downloaded from an application store and installed on end user computing device 102. In another embodiment in which end user device 102 is utilized as part of or in conjunction with an enterprise network, at least one application is distributed to end user computing device 102 by a system administrator using any of a variety of enterprise network management tools and then installed thereon. In yet another embodiment, at least one application is installed on end user computing device 102 by a system builder, such as by an original equipment manufacturer (OEM) or embedded device manufacturer, using any of a variety of suitable system builder utilities. In a further embodiment, an operating system manufacturer may include an application along with operating system 128 that is installed on end user computing device 102.

Operating system 128 comprises a set of programs that manage resources and provide common services for applications that are executed on end user computing device 102, such as applications 126. Among other features, operating system 128 comprises an operating system (OS) user interface 132. OS user interface 132 comprises a component of operating system 128 that generates a user interface by which a user can interact with operating system 128 for various purposes, such as but not limited to finding and launching applications, invoking certain operating system functionality, and setting certain operating system settings. In one embodiment, OS user interface 132 comprises a touch-screen based graphical user interface (GUI), although this is only an example. In further accordance with such an example, each application 126 installed on end user computing device 102 may be represented as an icon or tile within the GUI and invoked by a user through touch-screen interaction with the appropriate icon or tile. However, any of a wide variety of alternative user interface models may be used by OS user interface 132.

Although applications 126 and operating system 128 are shown as being stored in non-volatile memory 124, it is to be understood that during operation of end user computing device 102, copies of applications 126, operating system 128, or portions thereof, may be loaded to volatile memory 112 and executed therefrom as processes by processing unit 110.

Digital personal assistant 130 comprises a computer program that is configured to perform tasks, or services, for a user of end user computing device 102 based on user input as well as features such as location awareness and the ability to access information from a variety of sources including online sources (such as weather or traffic conditions, news, stock prices, user schedules, retail prices, etc.). Examples of tasks that may be performed by digital personal assistant 130 on behalf of the user may include, but are not limited to, placing a phone call, launching an application, sending an e-mail or text message, playing music, scheduling a meeting or other event on a user calendar, obtaining directions to a location, obtaining a score associated with a sporting event, posting content to a social media web site or microblogging service, recording reminders or notes, obtaining a weather report, obtaining the current time, setting an alarm, obtaining a stock price, finding a nearby commercial establishment, performing an Internet search, or the like. Digital personal assistant 130 may use any of a variety of artificial intelligence techniques to improve its performance over time through continued interaction with the user. Digital personal assistant 130 may also be referred to as an intelligent personal assistant, an intelligent software assistant, a virtual personal assistant, or the like.

Digital personal assistant 130 is configured to provide a user interface by which a user can submit questions, commands, or other verbal input and by which responses to such input or other information may be delivered to the user. In one embodiment, the input may comprise user speech that is captured by one or more microphones of end user computing device 102 (each of which may comprise one of user input device(s) 116 or sensor(s) 122), although this example is not intended to be limiting and user input may be provided in other ways as well. The responses generated by digital personal assistant 130 may be made visible to the user in the form of text, images, or other visual content shown on display 118 within a graphical user interface of digital personal assistant 130. The responses may also comprise computer-generated speech or other audio content that is played back via speaker(s) 120.

In accordance with embodiments, digital personal assistant 130 is capable of proactively initiating conversations with a user of end user computing device 102. As will be discussed below, digital personal assistant 130 is programmed to initiate conversations at times that are determined by digital personal assistant 130 to be appropriate for doing so. To this end, digital personal assistant 130 leverages a variety of signals that relate to the availability of the user and to the user's mental or emotional state to determine whether a particular time is appropriate for starting a conversation. If the user signals relating to the user's availability and/or mental and emotional state indicate that the particular time is appropriate for starting a conversation, then digital personal assistant 130 will attempt to initiate a conversation. However, if the user signals relating to the user's availability and mental or emotional state indicate that the particular time is not appropriate for starting a conversation, then digital personal assistant 130 will not attempt to initiate a conversation. By leveraging user signals in this manner, digital personal assistant 130 can proactively initiate conversations with the user in a manner that is less likely to be perceived as annoying, invasive, or untimely.

Figure 2:
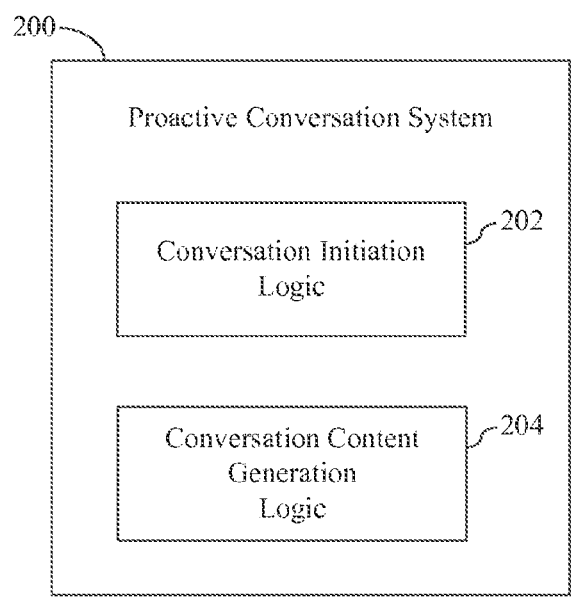
FIG. 2 is a block diagram of a proactive conversation system that may be implemented by a digital personal assistant in accordance with an embodiment.

FIG. 2 is a block diagram of a proactive conversation system 200 that may be used by digital personal assistant 130 to provide the aforementioned features. As shown in FIG. 2, proactive conversation system 200 includes conversation initiation logic 202 and conversation content generation logic 204. Conversation initiation logic 202 comprises logic that is configured to determine an appropriate time to start a conversation with a user and to attempt to initiate such a conversation at such an appropriate time. Conversation content generation logic 204 comprises logic that is configured to generate the contribution of digital personal assistant 130 to a conversation with a user, once such conversation has been successfully initiated. Such contribution may comprise, for example, text, images, or other visual content that will be shown to the user via display 118 or computer-generated speech or other audio content that will be played back to the user via speaker(s) 120.

In one embodiment, proactive conversation system 200 comprises part of digital personal assistant 130. In another embodiment, proactive conversation system 200 comprises part of digital personal assistant backend 106 and operates in conjunction with digital personal assistant (e.g., operates as a service that is invoked by or otherwise supports digital personal assistant 130). In still further embodiments, the logic that makes up proactive conversation system 200 may be distributed in some manner between digital personal assistant 130 and digital personal assistant backend 106.

Figure 3:
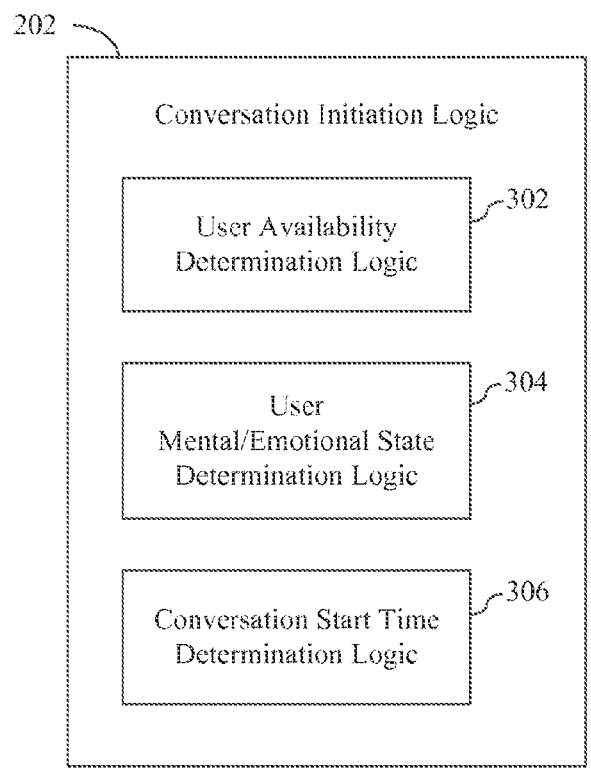
FIG. 3 is a block diagram of conversation initiation logic that comprises part of the proactive conversation system of FIG. 2 in accordance with an embodiment.

FIG. 3 is a block diagram that illustrates various components of conversation initiation logic 202 in accordance with an embodiment. As shown in FIG. 3, conversation initiation logic 202 includes user availability determination logic 302, user mental/emotional state determination logic 304, and conversation start time determination logic 306. Each of these components will now be described.

User availability determination logic 302 is logic that is configured to obtain one or more signals related to the availability of a user at a particular time and to process those signals to determine the likelihood that the user is available to participate in a conversation initiated by digital personal assistant 130 at the particular time. For example, user availability determination logic 302 may analyze the signals related to the availability of the user to determine whether the user is occupied with an activity that should not be interrupted by an attempt to initiate a conversation. Various examples of the types of signals that may relate to the availability of a user at a particular time will be discussed in Section III below.

User mental/emotional state determination logic 304 is logic that is configured to obtain one or more signals related to the mental and/or emotional state of a user at a particular time and to process those signals to determine the likelihood that the user is in a suitable mental and/or emotional state to participate in a conversation initiated by digital personal assistant 130 at the particular time. For example, user mental/emotional state determination logic 304 may analyze the signals related to the mental and/or emotional state of the user to determine whether the user is in the right mood or frame of mind to respond to an attempt to initiate conversation by digital personal assistant 130. Various examples of the types of signals that may relate to the mental and/or emotional state of a user at a particular time will be discussed in Section III below.

Conversation start time determination logic 306 is logic that is configured to receive the likelihood determinations rendered by user availability determination logic 302 and user mental/emotional state determination logic 304 and to analyze such likelihood determinations to determine whether or not digital personal assistant 130 should attempt to initiate a conversation with a user at a particular point in time. For example, conversation start time determination logic 306 may be configured to permit digital personal assistant 130 to initiate a conversation with a user only if there is a relatively high likelihood that the user is available and a relatively high likelihood that the user is in a suitable mental and/or emotional state for conducting such a conversation. Still other approaches to deciding when a conversation can be initiated based on the outputs of user availability determination logic 302 and user mental/emotional state determination logic 304 may be used.

Figure 4:
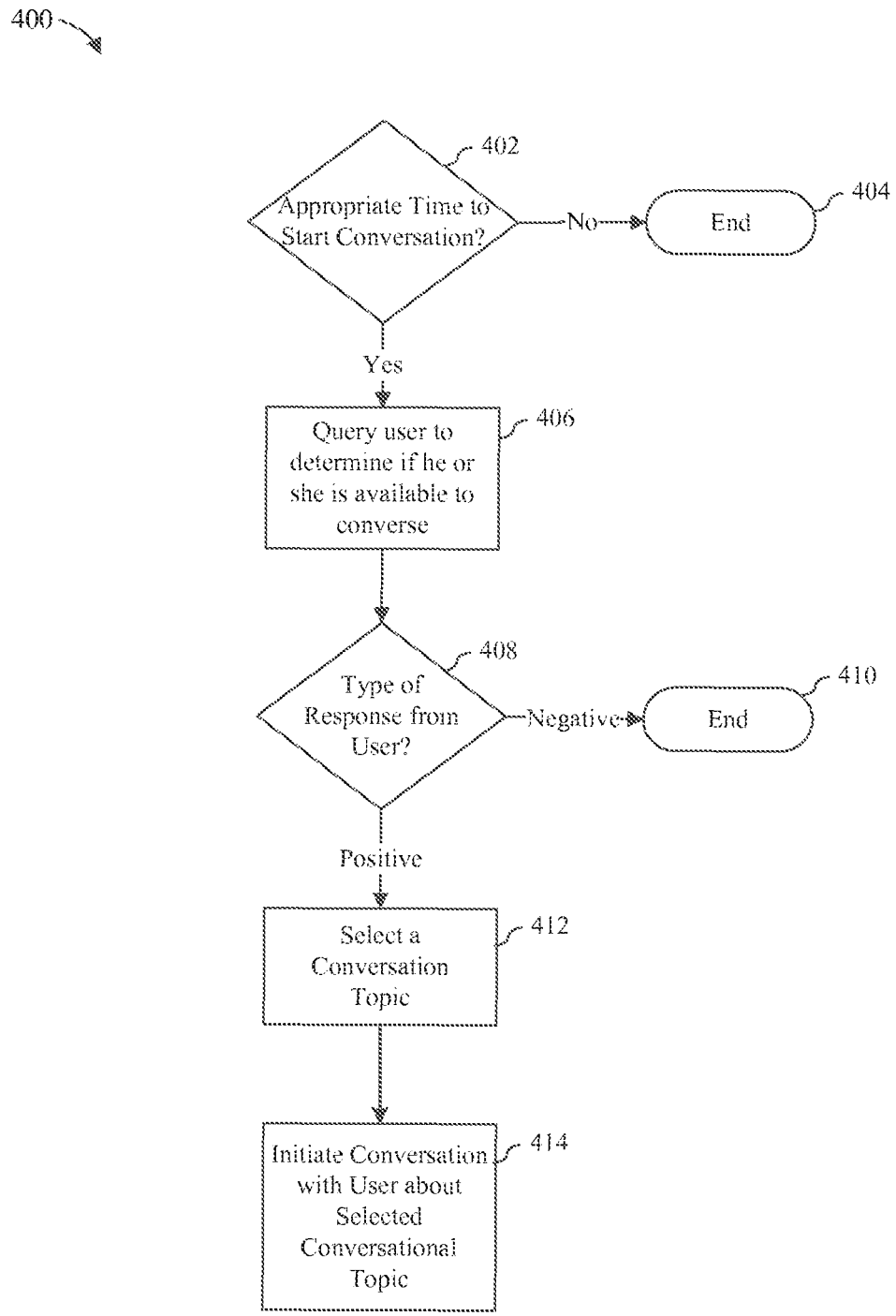
FIG. 4 depicts a flowchart of a method for proactively initiating a conversation with a user that may be performed by or on behalf of a digital personal assistant in accordance with an embodiment.

III. Example Methods of Operation of a Digital Personal Assistant that Leverages User Signals to Determine Appropriate Times to Proactively Initiate Conversations with a User Further details concerning the manner of operation of digital personal assistant 130 and proactive conversation system 200 will now be provided in reference to FIG. 4 and FIG. 5. In particular, FIG. 4 depicts a flowchart 400 of a method for proactively initiating a conversation with a user that may be performed by or on behalf of digital personal assistant 130. The method of flowchart 400 may be performed, for example, by proactive conversation system 200 as discussed above in reference to FIG. 2, which may itself comprise part of digital personal assistant 130 and/or digital personal assistant backend 106 as described above in reference to FIG. 1. Accordingly, the method of flowchart 400 will now be described with continued reference to proactive conversation system 200 of FIG. 2. However, the method is not limited to that implementation.

As shown in FIG. 4, the method of flowchart 400 begins at decision step 402, in which conversation initiation logic 202 determines whether a particular time (e.g., a current time or some future time) is appropriate for proactively starting a conversation with a user. If conversation initiation logic 202 determines that the particular time is not appropriate for starting a conversation with the user, then conversation initiation logic 202 will not attempt to initiate a conversation with the user at the particular time and the process ends as shown at step 404. However, if conversation initiation logic 202 determines that the particular time is appropriate for starting a conversation with the user, then conversation initiation logic 202 will attempt to initiate a conversation with the user at the particular time, such that control will flow to step 406. Various techniques by which conversation initiation logic 202 may determine whether the particular time is appropriate for proactively starting a conversation with the user will be described below in reference to flowchart 500 of FIG. 5.

At step 406, conversation initiation logic 202 attempts to initiate the conversation with the user. In an embodiment, this step may comprise querying the user to determine if he/she is available to converse and/or open to having a conversation. For example, during this step, conversation initiation logic 202 may cause digital personal assistant 130 to ask the user (it will be assumed that the user's name is Anna): "Hey Anna. Are you there?", or "Hey Anna, do you have a second?" or some other inquiry that is intended to determine whether the user is available and willing to have a conversation. Such inquiry may be generated audibly via speaker(s) 120, visually via text rendered to display 118, or both.

At decision step 408, conversation initiation logic 202 determines whether a positive or negative response to the query issued during step 406 has been received. A positive response may comprise any response from the user that indicates a willingness to converse while a negative response may comprise any response from the user that indicates that the user does not want to converse. For example, a positive response to the query "Hey Anna. Are you there?" may comprise the user utterance "I'm here." or "Yes. What's up?", while a negative response to the same query may comprise the user utterance "No." or "Not now." Furthermore, the absence of any user response within some predetermined timeframe may also be considered a negative response. Persons skilled in the relevant art(s) will readily appreciate that what comprises a positive or negative response may vary depending upon the query and the implementation.

If conversation initiation logic 202 determines that the user response is negative, then conversation initiation logic 202 will terminate the interaction with the user as shown at step 410. However, if conversation initiation logic 202 determines that the user response is positive then control flows to step 412.

At step 412, conversation content generation logic 204 selects a conversation topic. In an embodiment, this function is performed by an algorithm that considers one or more of a set of current events and a set of known interests of the users to select a topic that will likely be of interest to the user. The current events may be stored in one or more first database(s) that are accessible to conversation content generation logic 204 while the user interests may be stored in one or more second database(s) that are accessible to conversation generation logic 204. For example, conversation content generation logic 204 may select a conversation topic by identifying a current event from the first database(s) that is in some way related to a user interest stored in the second database(s). However, this is an example only, and persons skilled in the relevant art(s) will appreciate that a wide variety of methods may be used to select a conversation topic.

At step 414, conversation content generation logic 204 initiates a conversation with the user about the conversation topic that was selected during step 412. In an embodiment, this step includes generating a conversation topic string based on the conversation topic that was selected during step 412 and presenting the conversation topic string to the user. Such conversation topic string may be played back audibly via speaker(s) 120, rendered as text to display 118, or both. The conversation topic string may comprise, for example, a question to encourage the user to engage in a conversation. The goal of such conversation may be to delight the user by starting a conversation a conversation about the user's interests, as well as to learn more about the user. For example, if it is known that the user Anna is interested in football, the conversation topic string may be "Did you see the Packer's game, Anna?" Such a question can be used to determine if Anna is a Packers fan.

After step 414, the user may or may not respond to the initial conversation topic string. If the user responds, conversation content generation logic 204 may in turn generate a response, leading to a multi-turn conversation between digital personal assistant 130 and the user. The conversation may be also be terminated due to lack of a user response, negative feedback from the user, or based on other factors.

Figure 5:
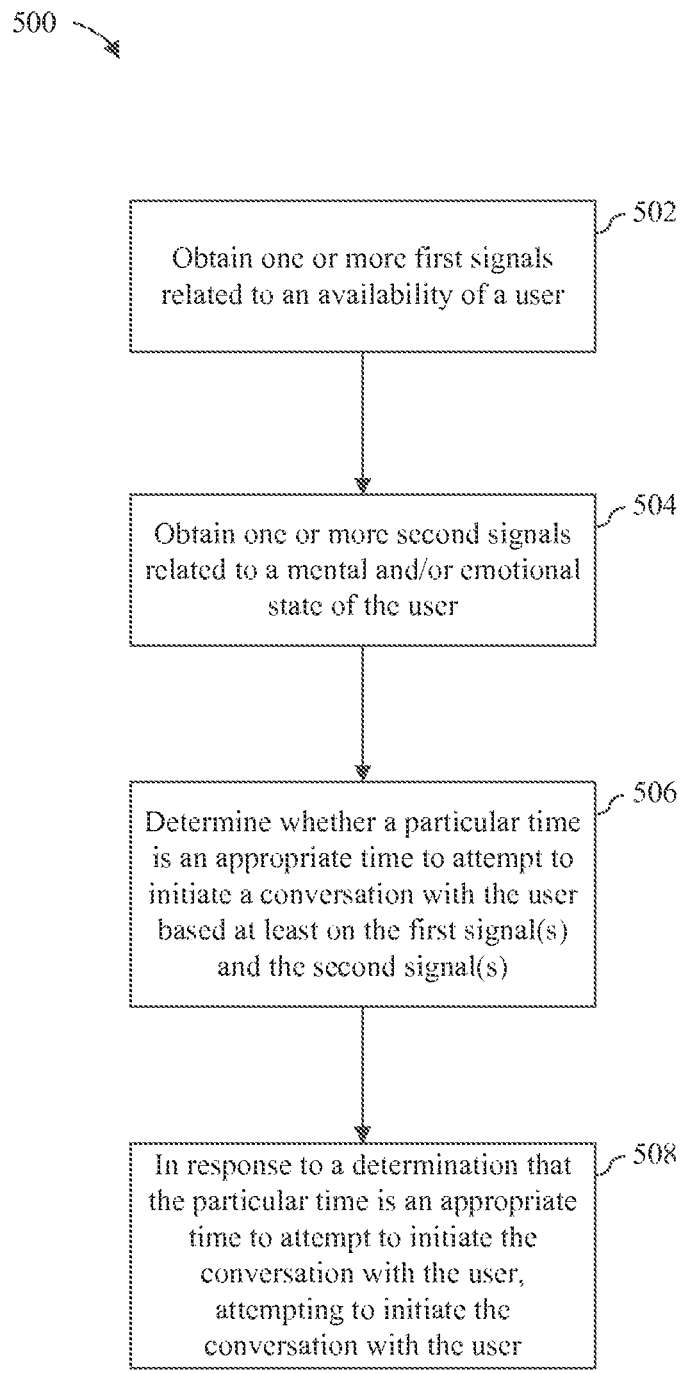
FIG. 5 depicts a flowchart of a method for determining whether a particular time is an appropriate time to attempt to initiate a conversation with a user that may be performed on or behalf of a digital personal assistant in accordance with an embodiment.

FIG. 5 depicts a flowchart 500 of a method by which conversation initiation logic 202 may operate to perform decision step 402 of flowchart 400—namely, to determine whether a particular time is an appropriate time to attempt to initiate a conversation with the user. Although the method of flowchart 500 will be described with continued reference to conversation initiation logic 202, the method is not limited to such an implementation.

As shown in FIG. 5, the method of flowchart 500 begins at step 502 in which conversation initiation logic 202 obtains one or more first signals related to an availability of a user. For example, user availability determination logic 302 within conversation initiation logic 202 may obtain the one or more first signals related to an availability of the user and analyze such signals to determine a likelihood that the user is available for a conversation at the particular time.

At step 504, conversation initiation logic 202 obtains one or more second signals related to a mental and/or emotional state of the user. For example, user mental/emotional state determination logic 304 within conversation initiation logic 202 may obtain the one or more second signals related to the mental and/or emotional state of the user and analyze such signals to determine a likelihood that the user is in a suitable mental and/or emotional state to participate in a conversation at the particular time.

At step 506, conversation initiation logic 202 determines whether the particular time is an appropriate time to attempt to initiate a conversation with the user based at least on the first signal(s) obtained during step 502 and the second signal(s) obtained during step 506. For example, conversation start time determination logic 306 within conversation initiation logic 202 may perform this step by: (1) receiving from user availability determination logic 302 a measure of the likelihood that the user is available for a conversation at the particular time, which is based on the first signals(s); (2) receiving from user mental/emotional state determination logic 304 a measure of the likelihood that the user in a suitable mental and/or emotional state to participate in a conversation at the particular time, which is based on the second signal(s); and (3) to analyze such measures of likelihood to determine whether or not digital personal assistant 130 should attempt to initiate a conversation with a user at a particular point in time. For example, conversation start time determination logic 306 may only permit digital personal assistant 130 to initiate a conversation with a user if there is a relatively high likelihood that the user is available and a relatively high likelihood that the user is in a suitable mental and/or emotional state for conducting such a conversation.

In the foregoing description, it is assumed that the final determination as to the appropriateness of a particular time for starting a conversation is premised on two previous determinations—one concerning the availability of the user and one concerning the mental and/or emotional state of the user. However, in an alternate embodiment, all of the first signal(s) and the second signal(s) may be considered together to render one determination concerning whether the particular time is appropriate. In accordance with such an implementation, user availability determination logic 302 may operate only to obtain the first signal(s) and pass them to conversation start time determination logic 306, user mental/emotional state determination logic 304 may operate only to obtain the second signal(s) and pass them to conversation start time determination logic 306, and conversation start time determination logic 306 may analyze such signals directly to determine if the particular time is appropriate for attempting to initiate a conversation with the user.

It is also noted that in certain embodiments, only one set of signals (e.g., only the first signal(s) or only the second signal(s)) may be analyzed to determine whether or not a particular time is suitable for attempting to initiate a conversation with the user. Furthermore, weighting may be used to increase or decrease the contribution of certain signals relative to other signals with respect to an availability determination, a mental/emotional state determination, or to a final determination as to whether a particular time is appropriate for trying to start a conversation. Conversation start time determination logic 306 may also apply different weights to an availability determination generated by user availability determination logic 302 and to a mental/emotional state determination generated by user mental/emotional state determination logic 304.

At step 508, if conversation initiation logic 202 determines that the particular time is an appropriate time to initiate the conversation with the user, then conversation initiation logic 202 attempts to initiate a conversation with the user. For example, conversation initiation logic 202 may attempt to initiate a conversation with a user using any of the methods that were previously described with respect to step 412 and 414 of flowchart 400 as described above in reference to FIG. 4, although still other methods may be used.

Various types of signals that may be used to determine user availability and user mental and/or emotional state will now be described. Depending on the signal type, the signal may be obtained locally by end user computing device 102 or from a remote entity, including but not limited to the computer(s) that comprise digital personal assistant backend 106. After the description of the various signal types, a description of how the types of signals used may vary from context to context and a description of how machine learners may be used to implement embodiments will also be provided.

A. Signals that Relate to the Availability of a User

An exemplary and non-limiting description of signals that may be accessible to conversation initiation logic 202 and used thereby to help determine if a user is available to have a conversation at a particular time will now be provided. The signals described below can be used to infer when the user is occupied such that he or she is unlikely to be available to participate in a conversation as well as when a user is unoccupied such that he or she is likely to be available to participate in a conversation.

User Calendar Information:

Conversation initiation logic 202 may be able to access a user's calendar data that is stored locally on end user computing device 102 (e.g., data associated with a calendar application installed on end user computing device 102) or may access remotely-stored user calendar data via network interface(s) 114 to determine if a user is available. Such calendar information can provide explicit guidance as to when a user is occupied or unoccupied.

User's Daily Habits:

A user's activities may be tracked over time by digital personal assistant 130 and/or by a service or entity that is accessible thereto to obtain information concerning a user's daily routines or habits. These daily habits can then be used to infer when a user may be busy or unoccupied. For example, time that is typically considered the user's downtime may be considered suitable for trying to initiate a conversation.

Current User Activity:

Data obtained by sensor(s) 122 or other components of end user computing device 102 can be used to determine if the user is engaged in a type of activity that should not be interrupted. For example, accelerometer data may be used to determine that the user is driving at high speeds. Microphone input may indicate that the user is conversing with or otherwise in the company of another person. Application, input/output, network, and/or operating system activity on end user computing device 102 can be analyzed to determine whether the user is performing certain activities on the device such as working (e.g., drafting a document), communicating with others (e.g., drafting and/or responding to e-mails or text messages), conducting a telephone call or teleconference, watching a video or listening to music.

A distinction may be made between "focused" and "unfocused" activities, with "unfocused" activities being ones that are more susceptible to interruption. For example, a user watching television may be deemed to be "focused" if they are watching a pay-per-view movie and may be deemed to be "unfocused" if they are viewing a channel guide, channel surfing, or watching a commercial. These are only a few examples, and any of a wide variety of factors may be used to determine whether a particular activity is focused or unfocused, depending upon the implementation and the activity type.

B. Signals that Relate to the Mental and/or Emotional State of a User

An exemplary and non-limiting description of signals that may be used to help determine a mental and/or emotional state of a user at a particular time will now be provided. The signals described below can be used to determine when the user is in a suitable mental and/or emotional state for participating in conversation proactively initiated by digital persona assistant 130.

User's Facial Expressions.

A user's facial expressions may be obtained (e.g., by at least one camera included within end user computing device 102) and analyzed to help determine the user's current mental and/or emotional state. For example, a user's facial expressions may be analyzed to identify recent signs of stress or tiredness which might indicate that this is not a bad time to initiate a conversation. However, if the user's facial expressions indicate that he or she is calm and relaxed, this may indicate that this is a good time to initiate a conversation.

User's Voice.

Samples of a user's voice may be obtained (e.g., by at least one microphone included within end user computing device 102) and analyzed to help determine the user's current mental and/or emotional state. For example, if it is detected that the user's vocal cords are constricted, or if the user's voice otherwise demonstrates agitation, then this may indicate that the user is under stress. As another example, if the pitch of the user's voice becomes higher, then this may indicate happiness. As yet another example, the use of a monotonous tone may indicate sadness. Still other features of the user's voice may be analyzed to help determine the mental and/or emotional state of the user.

User Location.

User location may be obtained from a GPS sensor or from some other location-determining component or service that exists on end user computing device 102 or is otherwise accessible thereto. An algorithm may be implemented that can identify locations where the user tends to be in a certain mental or emotional state. For example, such an algorithm may be used to identify locations where the user tends to be happy or relaxed or where the user tends to be sad or experience stress. By leveraging information about the location of the user, then, it can be determined whether the user is approaching or at a location where he will be in one of those mental or emotional states.

Rate at which User is Turning on and Off Mobile Device.

In an embodiment in which end user computing device 102 is a mobile device such as a smart phone, information about the user's mental and/or emotional state can be obtained by analyzing how frequently the user is turning on and off the mobile device. For example, if a user is turning on and off the mobile device at a relatively high rate, this may indicate that the user is under stress.

Keystroke and Gesture Metadata.

In an embodiment in which end user computing device 102 includes or is connected to a keyboard, keypad or other input device upon which a user may type, the speed of the user's typing may be analyzed to determine the user's mental and/or emotional state. For example, if the typing speed of the user is relatively high, then this may be indicative that the user is agitated or under stress. Similarly, the speed at which a user taps or swipes a touchscreen can be used to help determine the user's mental and/or emotional state. The rate of errors in keystrokes or gestures may also be analyzed to determine mental and/or emotional state.

In an embodiment in which end user computing device 102 includes or is connected to a pressure-sensitive input device such as a pressure-sensitive keyboard, keypad or touchscreen, the amount of pressure applied by the user while using such an input device (i.e., while typing on a keyboard or keypad or tapping or swiping a touchscreen) can be monitored to help determine the user's mental and/or emotional state. For example, a relatively high level of pressure may indicate that the user is under stress. For touchscreens and capacitive mice, contact area may also be considered.

Analysis of Written or Spoken Content of the User.

Written content generated by a user (e.g., text input by the user into end user computing device 102) or spoken content generated by a user (e.g., spoken content captured by microphone(s) of end user computing device 102) may be analyzed to help determine the user's mental or emotional state. For example, the use of certain words may indicate that the user is in a positive or negative state of mind Additionally, the amount and type of punctuation marks included by the user in written text may be indicative of his/her mental and/or emotional state. For example, the use of a relatively large number of exclamation points may indicate that the user is happy. Still other analysis techniques may be applied to the verbal content spoken or written by the user to help determine the user's mental and/or emotional state.

Application Interaction Metadata.

The type of applications with which a user interacts and the manner of such interaction may be analyzed to help determine the user's mental and/or emotional state. For example, the frequency at which a user switches context between different applications installed on end user computing device 102 may be monitored and used to help determine the user's mental and/or emotional state. For example, a relatively high switching frequency may indicate that the user is under stress while a relatively low switching frequency may indicate the opposite.

As another example, the amount of time a user spends in an application may be indicative of their mental and/or emotional state. For example, if a user is spending a relatively long time in a social media application as FACEBOOK, this may indicate that the user is bored. On the other hand, if the user is spending a relatively long time in an e-mail application, this may indicate that the user is extremely focused.

The degree to which a user is watching or reading while using an application versus typing or gesturing may be analyzed to determine the user's mental and/or emotional state.

Music or videos being played by a user via a media application and the metadata associated with such music or videos may be analyzed to determine the user's mental and/or emotional state.

Accelerometer, Compass and/or Gyroscope Output.

The speed of movement of a user may be obtained from an accelerometer within end user computing device 102 and used to help determine the user's mental and/or emotional state. For example, it may be a determined that a user is typically under more stress when in a moving vehicle than when walking. The direction in which a user is heading as provided by a compass and the orientation of a user as determined by a gyroscope may also be used to determine a user's mental and/or emotional state.

Exposure to Light.

An ambient light sensor or other suitable sensor within end user computing device 102 may be used to determine how long a user has been exposed to light and how much light the user has been exposed to. Such a sensor may also be used to determine the time of year, whether the user is inside or outside, whether it is day or night, or even the user's vitamin D level. This information can be used to help determine the user's mental and/or emotional state.

Temperature.

A thermometer within end user computing device 102 may be used to determine things like the time of year, whether the user is inside or outside, and the like. Such information can be used to help determine the user's mental and/or emotional state.

Weather Conditions, Traffic Conditions, Pollution Levels, and Allergen Levels.

A weather application and/or one or more sensors (e.g., a thermometer, an ambient light sensor, etc.) may be used to determine the weather conditions that a user is experiencing. This information may then be used to help determine the user's mental and/or emotional state. For example, it may be determined that the user is more likely to be happy when it is sunny out and more likely to be sad when it is overcast or raining. Information may also be obtained concerning local traffic conditions, pollution levels and allergen levels, and this information may also be used to help determine the user's mental and/or emotional state.

Activity Level of User.

The degree to which the user is active may be determined by monitoring a user's calendar, tracking a user's movements over the course of a day, or via some other mechanism. This information may then be used to help determine the user's mental and/or emotional state. For example, if it is determined that the user has spent much of the day in meetings, then this may indicate that the user is likely to be tired.

Heart Rate, Heart Rate Variability and Electrodermal Activity.

A camera included within end user computing device 102 may be used to analyze the color of the user's skin to determine blood flow for measuring the user's heart rate and/or heart rate variability. Such information may then be used to help determine the user's mental and/or emotional state. Additionally, suitable sensors of computing device 102 may be used to measure electrodermal activity (EDA), which are autonomic changes in the electrical properties of the user's skin. Such EDA measurements can be used to determine the mental and/or emotional state of the user. To acquire such data, electrodes may be included on an input device that a user touches or on a housing of computing device 102 that is likely to be held by the user (e.g., such as the edges or back of a phone). Still other methods for acquiring EDA data may be used.

Device/Network Connection Information.

Bluetooth, WiFi, cellular, or other connections established by end user computing device 102 may be monitored to help determine the user's mental and/or emotional state. For example, the fact that the user is connected to certain other devices such as health-related wearable devices, gaming devices, or music devices can help determine the user's mood. As another example, determining that the user is connected to a corporate network or a home network can be used to determine whether the user is at work or home. As yet another example, the cellular network to which the user is connected can provide a clue as to where the user is currently located (e.g., if in a different country).

Battery/Charging Information.

The current battery level of end user computing device 102 and whether or not it is in a charging state may also be useful in determining the mental and/or emotional state of the user. For example, if end user computing device 102 is connected to a charger, this may indicate that the user is likely nearby focused on something else (e.g., at home). However, if the battery is low and it is later in the day, this may indicate that the user is more likely to be tired and out and about.

C. Context-Based User Signal Analysis

In some embodiments, the types of user signals that are considered in determining a user's availability or mental and/or emotional state may depend, at least to some extent, upon the user's current context. To help demonstrate this, the following will provide an exemplary and non-limiting list of user signals that may be relevant to determining the availability and/or mental or emotional state of an example user, Anna, when (a) Anna is driving in her car and (b) when Anna is at home. While some of the user signals are applicable in both contexts, some are useful only within a particular context.

Anna is Driving.

While Anna is driving, the following user signals may be useful in determining Anna's availability and/or mental or emotional state: whether there is someone else in the car with Anna; what the traffic like along Anna's driving route; whether Anna is currently talking on the phone or texting (e.g., whether Anna has recently sent or received a text message); whether Anna is listening to music versus listening to the news; whether Anna is streaming music or podcasts from over her mobile device; whether Anna is using GPS for active navigation; whether the car is moving or stopped; the speed at which the car is moving; the time of day (e.g., early morning or late-afternoon rush hour versus very late at night); and current weather conditions.

Anna is at Home.

While Anna is driving, the following user signals may be useful in determining Anna's availability and/or mental or emotional state: whether Anna is alone or with other people; whether Anna is standing up, sitting up or lying down (e.g., as determined from gyroscope data); whether Anna is snoring or making other sounds that indicates that she is sleeping; whether Anna is watching television or a movie or playing a video game; the type of content being watched on television (e.g., light entertainment vs. news); whether television is being watched in a focused manner or Anna is multitasking while watching television; Anna's past behavior while at home at similar times (e.g., normally in the evenings between 7 and 8 PM, Anna kills time on her phone); whether Anna had a long day at work (e.g., coupled with the fact that Anna is an introvert, this may mean Anna should be left alone, while coupled with the fact that Anna is an extrovert, this may mean that Anna is open to suggestions for some people-related activity); whether Anna is channel surfing; and whether Anna is searching for something, whether it may be on the Internet, browsing a music service, or searching a games library.

D. Implementations Based on Machine Learning

In an embodiment, machine learning may be used to determine which of a set of user signals is most useful for determining a user's mental and/or emotional state. For example, a test population may be provided with devices (e.g., devices similar to end user computing device 102) that are capable of collecting user signals, such as any or all of the user signals described in the preceding subsection. The users in the test population may then use the devices over time while intermittently self-reporting their mental and/or emotional states. A machine learner may then take as training input the user signals and the self-reported mental and/or emotional states and correlate the data so as to determine which user signals are most determinative of a particular mental or emotional state. The user signals that are identified as being determinative (or most determinative) of a particular mental or emotional state may then be included in a mental/emotional state determination algorithm that is then included on end user computing devices that are distributed to the general population.

In the foregoing example, the machine learner is trained by a test population. In a further embodiment, a machine learner may be included as part of digital personal assistant 130 or used in conjunction therewith and trained based on the activities of a particular user to customize the set of signals used for determining mental and/or emotional state for the particular user. In accordance with such an embodiment, the user may start with a "default" or "general" algorithm for determining mental and/or emotional state (which may be obtained by training a machine learner with data from a test population as noted above). Then, over time, user signals will be collected by the user's device as well as intermittent input concerning the user's own mental and/or emotional state. This latter input may be inferred based on a particular set of user signals or explicitly provided by the user. The user signals and the input concerning the user's mental and/or emotional state are provided as training data to the machine learner. The machine learner can use the training data to better identify and weight the various user signals that will be used to identify the user's mental and/or emotional state going forward. Thus, the algorithm for determining the user's mental and/or emotional state can be tuned to the specific characteristics and preferences of the user and to the specific way(s) that he/she expresses emotions. It can also track shifts in these characteristics, preferences and expressions.

Although the foregoing mentions machine learning as one way to identify the set of signals to be used to determine the mental and/or emotional state of the user, this is not intended to be limiting. As will be readily appreciated by persons skilled in the relevant art(s), a variety of other methods may be used to identify such signals and to process such signals to determine mental and/or emotional state. Such methods may be carried out utilizing data acquired from testing groups or from users while actual using their devices.

IV. Example Mobile Device Implementation

Figure 6:
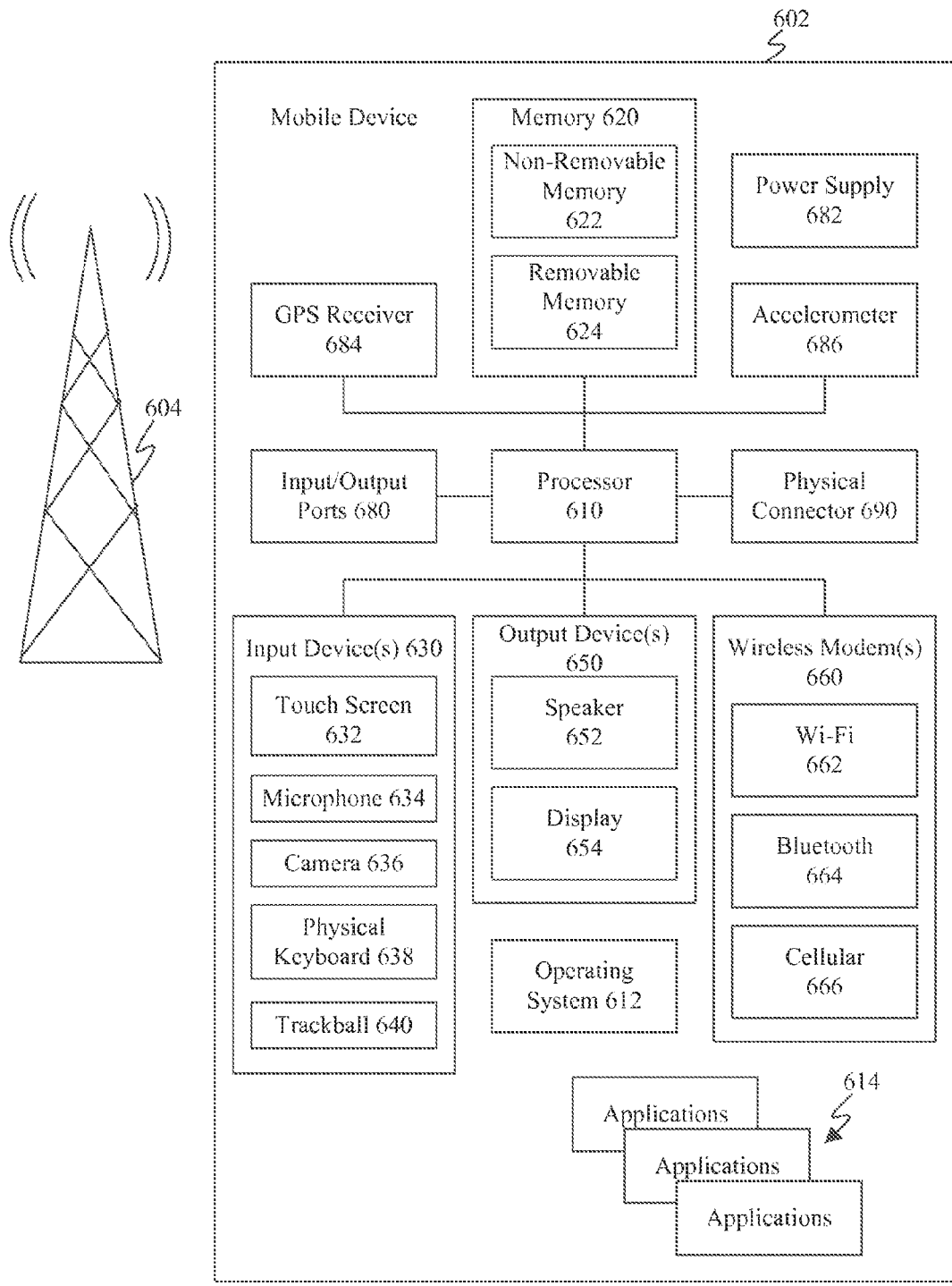
FIG. 6 is a block diagram of an example mobile device that may be used to implement various embodiments.

FIG. 6 is a block diagram of an exemplary mobile device 602 that may be used to implement end user computing device 102 as described above in reference to FIG. 1. As shown in FIG. 6, mobile device 602 includes a variety of optional hardware and software components. Any component in mobile device 602 can communicate with any other component, although not all connections are shown for ease of illustration. Mobile device 602 can be any of a variety of computing devices (e.g., cell phone, smartphone, handheld computer, Personal Digital Assistant (PDA), etc.) and can allow wireless two-way communications with one or more mobile communications networks 604, such as a cellular or satellite network, or with a local area or wide area network.

The illustrated mobile device 602 can include a controller or processor 610 (e.g., signal processor, microprocessor, ASIC, or other control and processing logic circuitry) for performing such tasks as signal coding, data processing, input/output processing, power control, and/or other functions. An operating system 612 can control the allocation and usage of the components of mobile device 602 and support for one or more application programs 614 (also referred to as "applications" or "apps"). Application programs 614 may include common mobile computing applications (e.g., e-mail, calendar, contacts, Web browser, and messaging applications) and any other computing applications (e.g., word processing, mapping, and media player applications). In one embodiment, application programs 614 include digital personal assistant 130.

The illustrated mobile device 602 can include memory 620. Memory 620 can include non-removable memory 622 and/or removable memory 624. Non-removable memory 622 can include RAM, ROM, flash memory, a hard disk, or other well-known memory devices or technologies. Removable memory 624 can include flash memory or a Subscriber Identity Module (SIM) card, which is well known in GSM communication systems, or other well-known memory devices or technologies, such as "smart cards." Memory 620 can be used for storing data and/or code for running operating system 612 and applications 614. Example data can include Web pages, text, images, sound files, video data, or other data to be sent to and/or received from one or more network servers or other devices via one or more wired or wireless networks. Memory 620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 602 can support one or more input devices 630, such as a touch screen 632, a microphone 634, a camera 636, a physical keyboard 638 and/or a trackball 640 and one or more output devices 650, such as a speaker 652 and a display 654. Touch screens, such as touch screen 632, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 632 and display 654 can be combined in a single input/output device. The input devices 630 can include a Natural User Interface (NUI).

Wireless modem(s) 660 can be coupled to antenna(s) (not shown) and can support two-way communications between the processor 610 and external devices, as is well understood in the art. The modem(s) 660 are shown generically and can include a cellular modem 666 for communicating with the mobile communication network 604 and/or other radio-based modems (e.g., Bluetooth 664 and/or Wi-Fi 662). At least one of the wireless modem(s) 660 is typically configured for communication with one or more cellular networks, such as a GSM network for data and voice communications within a single cellular network, between cellular networks, or between the mobile device and a public switched telephone network (PSTN).

Mobile device 602 can further include at least one input/output port 680, a power supply 682, a satellite navigation system receiver 684, such as a Global Positioning System (GPS) receiver, an accelerometer 686 (as well as other sensors, including but not limited to a compass and a gyroscope), and/or a physical connector 690, which can be a USB port, IEEE 1394 (FireWire) port, and/or RS-232 port. The illustrated components of mobile device 602 are not required or all-inclusive, as any components can be deleted and other components can be added as would be recognized by one skilled in the art.

In an embodiment, certain components of mobile device 602 are configured to perform the operations attributed to digital personal assistant 130 as described in preceding sections. Computer program logic for performing the operations attributed to digital personal assistant 130 as described above may be stored in memory 620 and executed by processor 610. By executing such computer program logic, processor 610 may be caused to implement any of the features of digital personal assistant 130 as described above in reference to FIG. 1. Also, by executing such computer program logic, processor 610 may be caused to perform any or all of the steps of any or all of the flowcharts depicted in FIGS. 4 and 5.

V. Example Computer System Implementation

Figure 7:
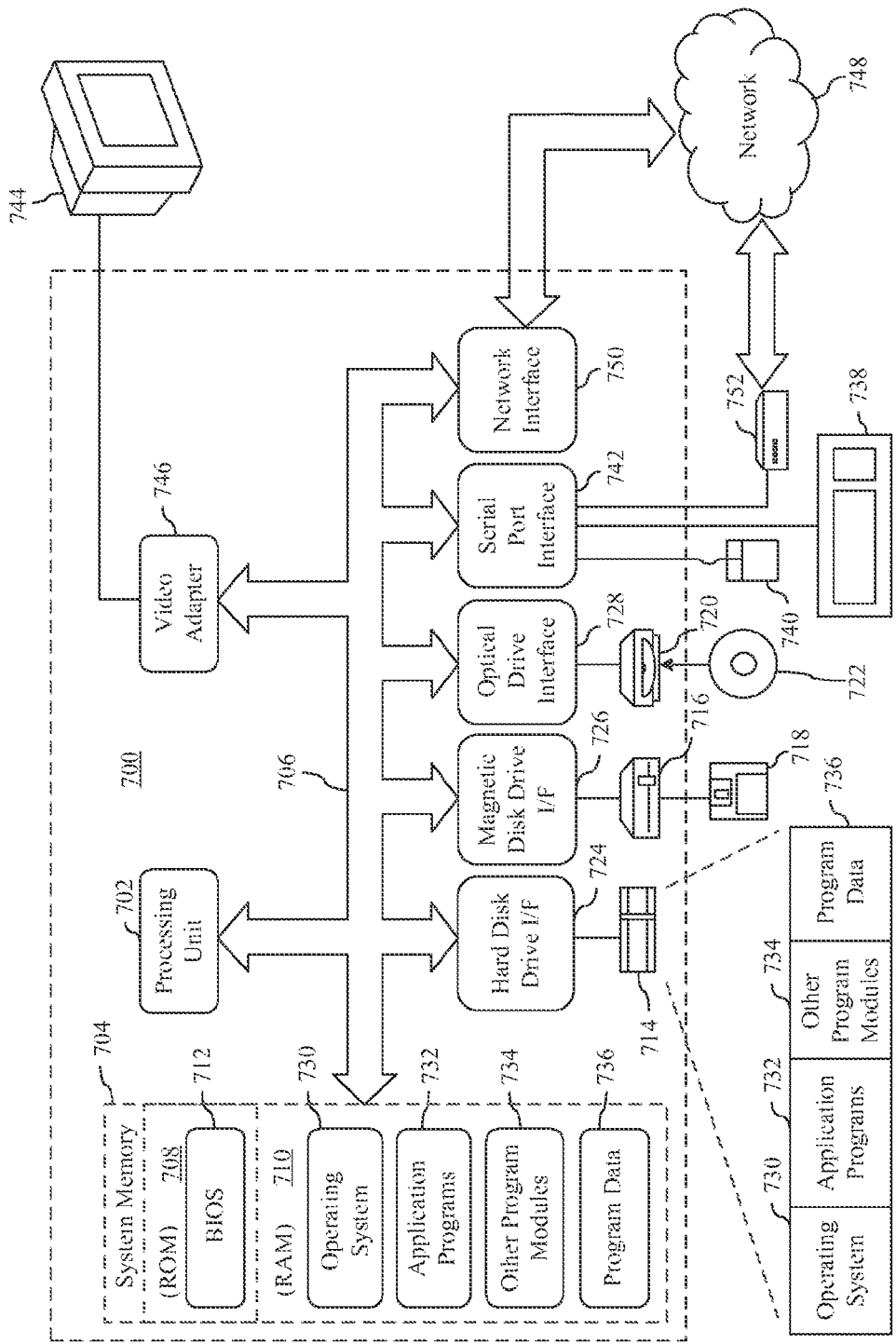
FIG. 7 is a block diagram of an example processor-based computer system that may be used to implement various embodiments.

FIG. 7 depicts an example processor-based computer system 700 that may be used to implement various embodiments described herein. For example, computer system 700 may be used to implement end user computing device 102 or any of the computers used to implement digital personal assistant backend 106 as described above in reference to FIG. 1. Computer system 700 may also be used to implement any or all of the steps of any or all of the flowcharts depicted in FIGS. 4 and 5. The description of computer system 700 provided herein is provided for purposes of illustration, and is not intended to be limiting. Embodiments may be implemented in further types of computer systems, as would be known to persons skilled in the relevant art(s).

As shown in FIG. 7, computer system 700 includes a processing unit 702, a system memory 704, and a bus 706 that couples various system components including system memory 704 to processing unit 702. Processing unit 702 may comprise one or more microprocessors or microprocessor cores. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer system 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, BLU-RAY™ disk or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 730, one or more application programs 732, other program modules 734, and program data 736. In accordance with various embodiments, the program modules may include computer program logic that is executable by processing unit 702 to perform any or all of the functions and features of end user computing device 102 or any of the computers used to implement digital personal assistant backend 106 as described above in reference to FIG. 1. The program modules may also include computer program logic that, when executed by processing unit 702, performs any of the steps or operations shown or described in reference to the flowcharts of FIGS. 4 and 5.

A user may enter commands and information into computer system 700 through input devices such as a keyboard 738 and a pointing device 740. Other input devices (not shown) may include a microphone, joystick, game controller, scanner, or the like. In one embodiment, a touch screen is provided in conjunction with a display 744 to allow a user to provide user input via the application of a touch (as by a finger or stylus for example) to one or more points on the touch screen. These and other input devices are often connected to processing unit 702 through a serial port interface 742 that is coupled to bus 706, but may be connected by other interfaces, such as a parallel port, game port, or a universal serial bus (USB). Such interfaces may be wired or wireless interfaces.

A display 744 is also connected to bus 706 via an interface, such as a video adapter 746. In addition to display 744, computer system 700 may include other peripheral output devices (not shown) such as speakers and printers.

Computer system 700 is connected to a network 748 (e.g., a local area network or wide area network such as the Internet) through a network interface or adapter 750, a modem 752, or other suitable means for establishing communications over the network. Modem 752, which may be internal or external, is connected to bus 706 via serial port interface 742.

As used herein, the terms "computer program medium," "computer-readable medium," and "computer-readable storage medium" are used to generally refer to memory devices or storage structures such as the hard disk associated with hard disk drive 714, removable magnetic disk 718, removable optical disk 722, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750, serial port interface 742, or any other interface type. Such computer programs, when executed or loaded by an application, enable computer system 700 to implement features of embodiments of the present invention discussed herein. Accordingly, such computer programs represent controllers of computer system 700.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, computer system 700 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by a digital personal assistant comprising a software agent implemented on at least one computing device, comprising:
    obtaining one or more first signals related to an availability of a user;
    obtaining one or more second signals related to a mental or emotional state of the user;
    determining whether a particular time is an appropriate time to attempt to initiate a conversation between the software agent and the user based at least on the first signal(s) and the second signal(s); and
    in response to a determination that the particular time is an appropriate time to attempt to initiate the conversation between the software agent and the user;
        querying the user to determine if he or she is available to converse; and
        in response to receiving a positive response to the query, selecting a conversation topic, and initiating a conversation between the software agent and the user about the selected conversation topic.

2. The method of claim 1, wherein the first signal(s) comprise one or more of:
    calendar information associated with the user;
    daily habits information associated with the user; and
    information associated with a current activity of the user.

3. The method of claim 1, wherein the second signal(s) comprise one or more of:
- facial expressions of the user;
- voice characteristics of the user;
- a location of the user;
- a rate at which the user is turning on and off a mobile device;
- keystroke and/or gesture metadata associated with the user;
- written and/or spoken content of the user;
- application interaction metadata associated with the user;
- accelerometer, compass, and/or gyroscope output;
- degree of exposure to light;
- temperature;
- weather conditions;
- traffic conditions;
- pollution and/or allergen levels;
- activity level of the user;
- heart rate and heart rate variability of the user;
- electrodermal activity of the user;
- device and/or network connection information for a device associated with the user; and
- battery and/or charging information for a device associated with the user.

4. The method of claim 1, wherein the second signal(s) comprise one or more signals identified by a machine learner as being determinative of the mental or emotional state of the user.

5. The method of claim 1, wherein the machine learner is trained by one or more of a test population and the user.

6. The method of claim 1, wherein selecting the conversation topic comprises:
- selecting the conversation topic based on one or more of a set of current events and a set of interests of the user.

7. The method of claim 6, wherein the set of current events are stored in one or more first databases, and wherein the set of interests of the user are stored in one or more second databases.

8. A system, comprising:
- at least one processor; and
- a memory that stores computer program logic for execution by the at least one processor, the computer program logic including one or more components configured to perform operations when executed by the at least one processor, the one or more components including:
  - a digital personal assistant comprising a software agent configured to obtain one or more signals related to an availability of a user, to obtain one or more second signals related to a mental or emotional state of the user, to determine whether a particular time is an appropriate time to attempt to initiate a conversation between the software agent and the user based at least on the first signal(s) and the second signal(s), and in response to a determination that the particular time is an appropriate time to attempt to initiate the conversation between the software agent and the user:
    - query the user to determine if he or she is available to converse; and
    - in response to receiving a positive response to the query, select a conversation topic, and initiate a conversation with the user about the selected conversation topic.

9. The system of claim 8, wherein the first signal(s) comprise one or more of:
- calendar information associated with the user;
- daily habits information associated with the user; and
- information associated with a current activity of the user.

10. The system of claim 8, wherein the second signal(s) comprise one or more of:
- facial expressions of the user;
- voice characteristics of the user;
- a location of the user;
- a rate at which the user is turning on and off a mobile device;
- keystroke and/or gesture metadata associated with the user;
- written and/or spoken content of the user;
- application interaction metadata associated with the user;
- accelerometer, compass, and/or gyroscope output;
- degree of exposure to light;
- temperature;
- weather conditions;
- traffic conditions;
- pollution and/or allergen levels;
- activity level of the user;
- heart rate and heart rate variability of the user;
- electrodermal activity of the user;
- device and/or network connection information for a device associated with the user; and
- battery and/or charging information for a device associated with the user.

11. The system of claim 8, wherein the second signal(s) comprise one or more signals identified by a machine learner as being determinative of the mental or emotional state of the user.

12. The system of claim 8, wherein the machine learner is trained by one or more of a test population and the user.

13. The system of claim 8, wherein the software agent is configured to select the conversation topic based on one or more of a set of current events and a set of interests of the user.

14. The system of claim 13, wherein the set of current events are stored in one or more first databases, and wherein the set of interests of the user are stored in one or more second databases.

15. A computer program product comprising a computer-readable memory device having computer program logic recorded thereon that when executed by at least one processor causes the at least one processor to perform a method of operating a digital personal assistant comprising a software agent, the method comprising:
- obtaining from a mobile device operated by a user one or more first signals related to an availability of the user;
- obtaining from the mobile device one or more second signals related to a mental or emotional state of the user;
- determining whether a particular time is an appropriate time to attempt to initiate a conversation between the software agent and the user based at least on the first signal(s) and the second signal(s); and
- in response to a determination that the particular time is an appropriate time to attempt to initiate the conversation between the software agent and the user:
  querying the user to determine if he or she is available to converse; and
  in response to receiving a positive response to the query, selecting a conversation topic, and initiating a conversation between the software agent and the user about the selected conversation topic.

16. The computer program product of claim 15, wherein the first signal(s) comprise one or more of:
- calendar information associated with the user;
- daily habits information associated with the user; and
- information associated with a current activity of the user.

17. The computer program product of claim 15, wherein the second signal(s) comprise one or more of:
  facial expressions of the user;
  voice characteristics of the user;
  a location of the user;
  a rate at which the user is turning on and off a mobile device;
  keystroke and/or gesture metadata associated with the user;
  written and/or spoken content of the user;
  application interaction metadata associated with the user;
  accelerometer, compass, and/or gyroscope output;
  degree of exposure to light;
  temperature;
  weather conditions;
  traffic conditions;
  pollution and/or allergen levels;
  activity level of the user;
  heart rate and heart rate variability of the user;
  electrodermal activity of the user;
  device and/or network connection information for a device associated with the user; and
  battery and/or charging information for a device associated with the user.

18. The computer program product of claim 15, wherein the second signal(s) comprise one or more signals identified by a machine learner as being determinative of the mental or emotional state of the user.

19. The computer program product of claim 15, wherein the machine learner is trained by one or more of a test population and the user.

20. The computer program product of claim 15, wherein selecting the conversation topic comprises selecting the conversation topic based on one or more of a set of current events and a set of interests of the user.

* * * * *